US012745321B2

(12) United States Patent
Datla et al.

(10) Patent No.: US 12,745,321 B2
(45) Date of Patent: Sep. 22, 2026

(54) METHODS AND SYSTEMS FOR SWITCHING PUSH-TO-TALK MODE TO VOICE OVER IP

(71) Applicant: T-Mobile USA, Inc., Bellevue, WA (US)

(72) Inventors: Jagannadha Anudeep Datla, Kent, WA (US); Harikishore Allu Balan, Lynnwood, WA (US)

(73) Assignee: T-Mobile USA, Inc., Bellevue, WA (US)

(*) Notice: Subject to any disclaimer, the term of this patent is extended or adjusted under 35 U.S.C. 154(b) by 317 days.

(21) Appl. No.: 18/542,334

(22) Filed: Dec. 15, 2023

(65) Prior Publication Data

US 2025/0203715 A1 Jun. 19, 2025

(51) Int. Cl.
*H04W 76/45* (2018.01)

(52) U.S. Cl.
CPC .................................. *H04W 76/45* (2018.02)

(58) Field of Classification Search
CPC ... H04W 36/12; H04W 36/14; H04W 36/302; H04W 36/362; H04W 4/023; H04W 4/10; H04W 36/322
See application file for complete search history.

(56) References Cited

U.S. PATENT DOCUMENTS 7,983,228 B1 7/2011 Choksi
8,929,938 B2 * 1/2015 Koren .................... H04W 4/10 455/518
9,379,779 B2 * 6/2016 Park ...................... H04W 36/14
9,491,596 B2 11/2016 Hammer et al.
2006/0215570 A1 * 9/2006 Zhang .................... H04L 45/28 370/242
2009/0017865 A1 * 1/2009 Cole ...................... H04W 8/18 455/552.1
2010/0097956 A1 * 4/2010 Tauil ...................... H04L 41/22 370/254
2015/0009865 A1 * 1/2015 Sharma ................ H04W 76/45 370/277
2016/0057676 A1 * 2/2016 White ............ H04W 36/00226 370/332
2017/0251084 A1 * 8/2017 Parron .................... H04L 69/28
2018/0132151 A1 * 5/2018 Milanese ............ H04W 36/302
2021/0084556 A1 * 3/2021 Gunnalan .......... H04W 36/304

* cited by examiner

*Primary Examiner* — Cindy Trandai
(74) *Attorney, Agent, or Firm* — Lee & Hayes, P.C.

(57) ABSTRACT

Methods and systems for switching a push-to-talk (PTT) session to a voice over IP session are described herein. In one implementation, a device configured to support PTT service may receive an interaction performed by a user with the device. The device then transmits a request to establish a PTT session with a second user to a PTT server connected to an evolved packet core (EPC) network. Once the PTT session is established, the PTT server may monitor the real-time audio quality of the PTT session. When the audio quality is determined to be low, the PTT server may send a notification to the device to switch the PTT session to a two-way audio session (e.g., voice over IP). Upon receiving the user's confirmation, the device may send a session initiation protocol (SIP) invite to an IP multimedia subsystem (IMS) to establish the voice over IP session.

20 Claims, 9 Drawing Sheets

METHODS AND SYSTEMS FOR SWITCHING PUSH-TO-TALK MODE TO VOICE OVER IP

BACKGROUND

Push-to-talk (PTT) services are widely used in industries such as construction, security, public safety, etc. Police departments, fire departments, and emergency medical services often use PTT services to ensure clear and immediate communication during critical situations. Construction sites and heavy equipment operators rely on PTT services for safety and coordination, allowing operators to communicate with ground personnel without distractions. With the development of mobile applications on the smart phones, PTT functionality is now available in various mobile applications and/or smart phones, allowing users to communicate with friends, family, or colleagues in real-time, especially in group settings. In some circumstances, however, PTT calls may drop due to unseen media issues from the PTT provider and/or from the network, causing inconvenience to users. Techniques discussed in this disclosure address the issues with PTT call drops and/or failure by utilizing the resources now accessible via the smart phones.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 7 illustrates an example computer server that implements techniques for switching push-to-talk mode to voice over IP, according to an example of the present disclosure.

DETAILED DESCRIPTION

Figure 1:
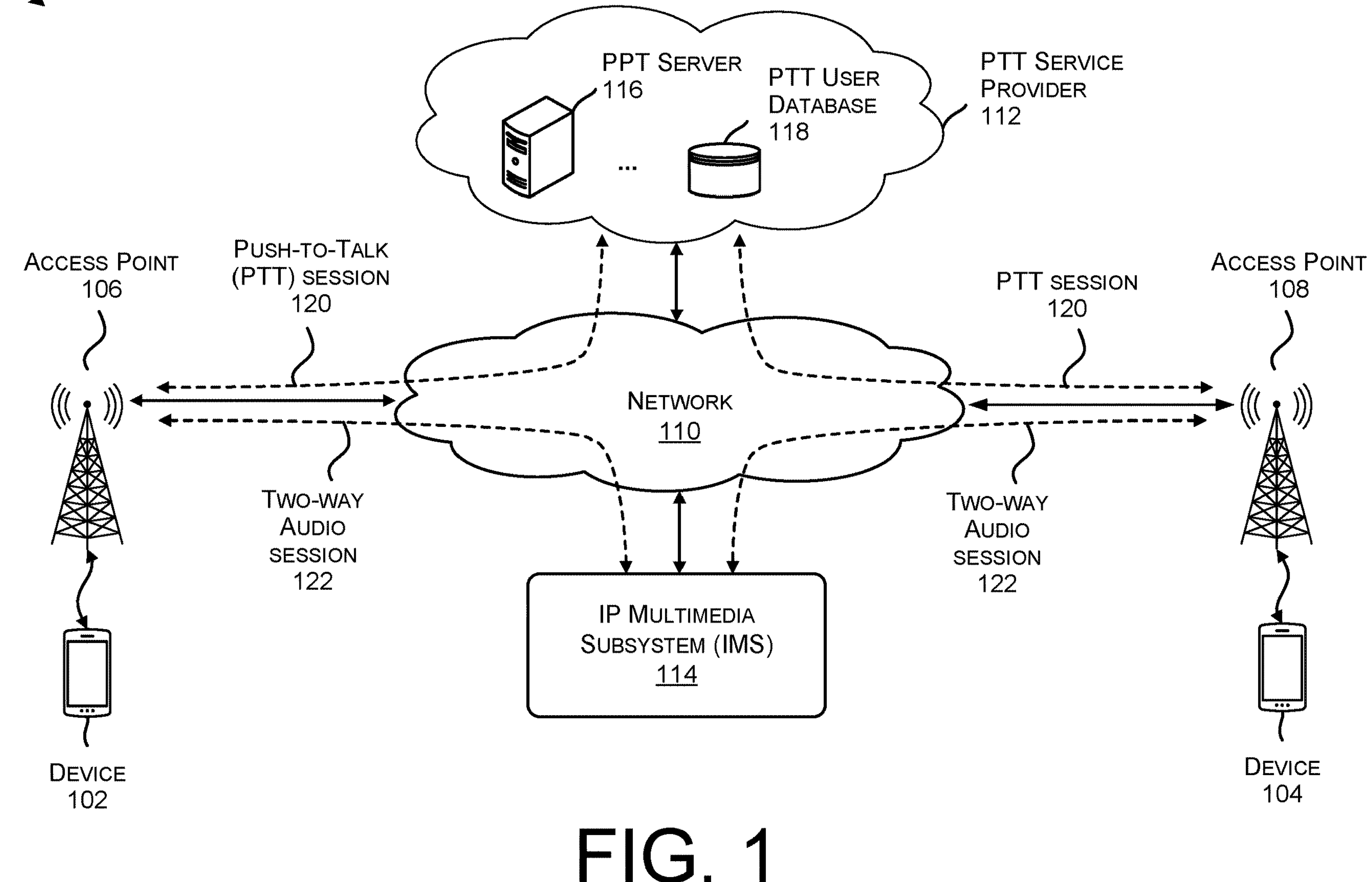
FIG. 1 illustrates an example environment, in which techniques for switching from push-to-talk mode to voice over IP is implemented, according to an example of the present disclosure.

Techniques for switching push-to-talk mode to voice over IP in telecommunications are disclosed herein.

In implementations, a system for switching push-to-talk mode to voice over IP may comprise at least one or more devices that are capable of supporting PTT services and a PTT service provider connected to a packet core network. The one or more devices may be further configured to transmit/receive data using any suitable wireless communication technologies, protocols, or standards. In implementations, the one or more devices may be registered with an Internet Protocol (IP) Multimedia Subsystem (IMS) of the packet core network when the one or more devices are powered on and/or roamed to the network.

The PTT service provider may comprise a PTT server that is configured to process the PTT session initiation request, establish the PTT session with a called party upon the request, monitor the call quality of the PTT session, notify the parties associated with the PTT session regarding poor call quality, and provide an option to switch the PTT session to a two-way audio session (e.g., voice over IP).

In some examples, the packet core network may be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Global System for Mobile Communications (GSM) technology, WiFi technology, and/or any other previous or future generation of radio access technology.

In implementations, a device (e.g., a calling party) may receive an interaction performed by a user with the device. The interaction may generate a request to establish a push-to-talk session with one or more second users (e.g., called parties). The device, in response to the interaction, may transmit the request to a server associated with push-to-talk service (e.g., PTT server). The PTT server may verify the identification of the calling party and search the network address of the called party. Once the identification of the calling party is verified, the PTT server may forward the request to the called party. The device (e.g., the calling party) may further receive a response from the PTT server indicating the push-to-talk session is established between the device and second devices associated with the one or more second users (e.g., the called parties).

In some examples, the PTT server may monitor the audio quality of the established PTT session and notify the parties involved in the PTT session when the audio quality is low. In some examples, the PTT server may measure a Mean Opinion Score (MOS) code of the PTT session on the radio frequency that carries the PTT session. For example, a MOS code value that is below 3.1 may indicate the audio quality is poor, and a MOS code value that is between 3.1 and 3.6 may indicate the audio quality is low. In other examples, the PTT server may measure a signal-to-noise ratio (SNR) and/or a jitter value associated with the audio signal transmitted through the PTT session. For example, an SNR of 10 dB to 15 dB may indicate the audio quality or connectivity quality is low.

In implementations, when the PTT server determines the audio quality of the PTT session is low, the PTT server may send a notification to the parties involved in the PTT session and provide an option to switch the PTT session to a two-way audio session (e.g., voice over IP session). In some examples, the PTT server may send the notification when the MOS code value is below 3.6. In some other examples, the PTT server may send the notification when the SNR value is below 10 dB. The notification may be presented to the device of the calling party. Alternatively or additionally, the notification may also be presented to one or more called parties.

In implementations, upon receiving the notification, the user may determine whether to switch the PTT session to a voice over IP (VOIP) session. When the user selects to switch the PTT session to a VoIP session, the device may transmit a session initiation protocol (SIP) invite to a server associated with the IMS network, requesting to establish a two-way call session with the called party. As discussed herein, the calling party and the called parties may be pre-registered with the IMS network. In implementations, the server associated with the IMS network may include a proxy call session control function (P-CSCF) that receives the SIP invite. The P-CSCF may forward the SIP invite to an interrogating CSCF (I-CSCF) of the IMS network, which may further authenticate the calling party by querying a home subscriber server (HSS) and route the request to a serving CSCF (S-CSCF) of the called parties. Once the request is accepted by the called parties, the two-way audio session (e.g., VoIP session) may be established.

In implementations, the user may confirm the switch from PTT session to VoIP session by selecting a button (e.g., a "Yes" or "Switch" button) displayed with the notification on the user interface of the device. In some examples, the user may confirm the switch from PTT session to VoIP session by pressing a programmable key disposed on the device. In some other examples, the user may confirm the switch from PTT session to VoIP session by voice inputting the instruction through the microphone of the device. Once the VoIP session is activated, the PTT session may be automatically terminated by the device. In some examples, the user may deny the option to switch from PTT session to VoIP session. In such circumstances, the PTT session between the calling party and the called parities may be maintained by the PTT server.

In some examples, an initial PTT session may involve multiple parties. When switching to VoIP session, the calling party may select one or more parties of the multiple parties to communicate in the VoIP session. In implementations, one or more keys on the device may be pre-programmed to direct the PTT call and/or VoIP call to target users and/or user groups. In some examples, a number of the multiple parties may be set as being equal to or less than four to avoid unwanted signaling and resource reservation on the network.

In some other examples, a calling party, after initiating a PTT call, may receive error messages from the network. The error messages may indicate the PTT server is not responding and/or the network has connection issues. In such circumstances, the device of the calling party may also prompt up with a suggestion to use VoIP instead.

According to present disclosure, the PTT service provider may be configured to monitor the real-time PTT session and determine whether the audio quality of the PTT session is low or below a threshold. The PTT service provider can notify the parties involved in the PTT session when the call quality is low, and suggest switching to VoIP session to secure conversation. Further, the device that supports PTT services may be configured to notify the user when the PTT service provider is not responding. The device may be further capable of presenting an option to use VoIP for communication. By utilizing the VoIP resources provided through the packet core network, the present disclosure can provide a secure and reliable communication among PTT service users when the PTT call drops or fails.

The techniques discussed herein may be implemented in a computer network using one or more of protocols including but are not limited to Ethernet, 3$^{rd}$ generation (3G), 4G, long term evolution (LTE), 5G, 6$^{th}$ generation (6G), the further radio access technologies, or any combination thereof. In some examples, the network implementations may support standalone architectures, non-standalone architectures, dual connectivity, carrier aggregation, etc. Example implementations are provided below with reference to the following figures.

FIG. 1 illustrates an example environment, in which techniques for switching from push-to-talk mode to voice over IP is implemented, according to an example of the present disclosure.

As illustrated, environment 100 may include device 102 that attaches to a network 110 through an access point 106 and device 104 that attaches to network 110 through an access point 108. A communication may be established between device 102 and device 104 through network 110. In some examples, the communication may be a push-to-talk (PTT) session 120 established by a PTT service provider 112. In another example, the communication may be a two-way audio session 122 established by an IP multimedia subsystem (IMS) 114, e.g., voice over IP session.

Device 102 and device 104 may also be referred to as user equipment (UE). The terms of "user equipment (UE)," "user device," "wireless communication device," "wireless device," "communication device," "mobile device," and "client device," can be used interchangeably to describe any UE that is capable of transmitting/receiving data wirelessly using any suitable wireless communications/data technology, protocol, or standard, such as Global System for Mobile communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VOIP), VOLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future Internet Protocol (IP)-based network technology or evolution of an existing IP-based network technology.

Examples of devices or UEs (e.g., device 102 and/or device 104) can include, but are not limited to, smart phones, mobile phones, cell phones, personal digital assistants (PDAs), or any other portable electronic devices that also support PTT services over the wireless communication network. In some examples, a PTT application associated with a PTT service provider may be installed on the devices or UEs. The user may launch the PTT application by selecting the PTT application on the user interface of the device. In some examples, the user may launch the PTT application by audio inputting an instruction to activate the PTT application through a microphone of the device. In yet other examples, the user may launch the PTT application by pressing a programmable key on the device. Any of device 102 and device 104 may be capable of supporting 4G radio communications, such as LTE radio communications, and 5G radio communications, such as New Radio (NR) communications. In some examples, device 102 and device 104 may be configured to support push-to-talk service over the radio frequencies provided by access point 106 and access point 108, respectively. In some examples, when an access point (e.g., access point 106 and/or access point 108) utilizes a 4G radio technology, the radio frequency band may include but not limited to a range of 450 MHz to 5.9 GHZ. When the access point (e.g., access point 106 and/or access point 108) utilizes a 5G radio technology, the radio frequency brand may include but not limited to 26 GHZ, 28 GHZ, 39 GHZ, 60 GHZ, etc. In some examples, any of device 102 and device 104 may be configured to support at least one of enhanced Mobile Broadband (eMBB) communications, Ultra Reliable Low Latency Communications (URLLCs), or massive Machine Type Communications (mMTCs). In some instances, the one or more devices can include at least one device supporting one or more of a sensor network, voice services, smart city cameras, gigabytes-in-a-second communications, 3D video, 4K screens, work & play in the cloud, augmented reality, industrial and/or vehicular automation, mission critical broadband, or self-driving cars.

In implementations, PTT session 120 may be half-duplex audio communication session similar to "walkie talkie." The calling party of PTT session 120 (e.g., device 102) may use a button or a key on the device to switch between voice transmission mode and voice reception mode. When a device (device 102 and/or device 104) is used in PTT mode, the device is switched from full duplex mode, where both parties can hear each other simultaneously, to half duplex mode, where only one party can speak at one time. Although two parties (e.g., device 102 and device 104) are shown in FIG. 1, multiple parties may be included in a PTT conversation. However, a number of the multiple parties may be set as being equal to or less than four to avoid unwanted signaling and resource reservation on the network.

In some examples, activating a PTT call and switching between voice transmission mode and voice reception mode may be achieved through an interaction on a user interface of the device such as a touch on a touch screen of the device. In yet some other examples, activating a PTT call and switching between voice transmission mode and voice reception mode may be achieved by pressing a programmable key on the device. In yet some other examples, activating a PTT call and switching between voice transmission mode and voice reception mode may be achieved through voice input to a microphone of the device. In implementations, two-way audio session 122 may be a voice over IP session established based upon Session Initiation Protocol (SIP) and Real-time Transport Protocol (RTP).

Although PTT session 120 and two-way audio session 122 (e.g., voice over IP session) are shown in FIG. 1 as examples of communication between device 102 and device 104. The present disclosure is not intended to be limiting. The communication between device 102 and device 104 may also include text message, multimedia message, video session, etc.

In implementations, network 110 may include a telecommunication core network compatible with one or more radio access technologies, wireless access technologies, protocols, and/or standards. For example, wireless and radio access technologies can include fifth generation (5G) technology, Long Term Evolution (LTE)/LTE Advanced technology, Evolved Packet Core (EPC), other fourth generation (4G) technology, High-Speed Data Packet Access (HSDPA)/Evolved High-Speed Packet Access (HSPA+) technology, Universal Mobile Telecommunications System (UMTS) technology, Global System for Mobile Communications (GSM) technology, WiFi technology, and/or any other previous or future generation of radio access technology. In some other implementations, network 110 may include a landline phone network such as Public Switched Telephone Network (PSTN), Internet that carries voice over IP (VoIP) services, etc. In some examples, network 110 may include multiple networks that are operated by different network operators and/or different mobile network operators (MNOs). Device 102 and device 104 may be configured to be capable of roaming among different networks.

In implementations, the access point (e.g., access point 106 and/or access point 108) may be located in a radio access network (RAN) compatible with various radio access technologies (RATs), such as 5G NR, 4G/LTE, HSDPA/HSPA+, UMTS, CDMA, GSM, WiMAX, Wi-Fi, and/or any other previous or future generation of radio access technology.

In implementations, PTT service provider 112 may be connected to network 110 and provide a direct connection between devices/UEs (e.g., device 102 and/or device 104) through network 110. PTT service provider 112 may include a PTT server 116 configured to process PTT calls from devices/UEs, connect/disconnect a PTT session (e.g., PTT session 120) between devices/UEs, provide caller ID service, monitor audio quality associated with the PTT sessions, etc. In some examples, the audio quality may be measured using a signal-to-noise ratio (SNR) over the radio frequency (RF). In some other examples, the audio quality may be measured using a jitter value over RF. In yet some other examples, the audio quality may be measured using a Mean Opinion Score (MOS) code. For example, when the MOS code value is below 3.1, which indicates the audio quality is poor, and/or when the MOS code value is between 3.1 and 3.6, which indicates the audio quality is low, PTT server 116 may notify a calling party and/or a called party and provide an option to switch the PTT session to a two-way audio session.

In implementations, PTT service provider 112 may further include a PTT user database 118 configured to store information of all subscribed users such as name, address, device type, plan information, payment method, etc. In implementations, the devices/UEs (e.g., device 102 and/or device 104) may be pre-registered to IMS 114 to be able to use two-way audio service when PTT session drops or fails. Although not shown, an IP multimedia subsystem (e.g., IMS 114) generally includes various network functions such as a proxy call session control function (P-CSCF), an interrogating CSCF (I-CSCF) and a serving CSCF (S-CSCF). During an initial registration, the device/UE (e.g., device 102 and/or device 104) may send a SIP register to P-CSCF of IMS 114 through network 110. The P-CSCF may send the SIP register to an I-CSCF to determine S-CSCF for the device/UE.

In implementations, IMS 114 may include multiple IMS networks to cover a large geographic region. The calling party and the called party may be served by a same S-CSCF of a same IMS network or different S-CSCFs of different IMS networks, depending on their locations.

In some examples, when a calling party (e.g., device 102 or device 104) receives a notification from PTT server 116 with an option to switch the PTT session to a two-way audio session, a user may select the option to switch to a two-way audio session. Upon receiving the selection on the device (e.g., through a push on a button or a key on the device, a touch on the touch screen, and/or a voice input, etc.), the calling party (e.g., device 102 or device 104) may automatically send a SIP message to IMS 114, requesting to establish a two-way audio session (e.g., voice over IP session) with a called party. Upon receiving the request, I-CSCF of IMS 114 may determine the S-CSCF of the called party by querying a domain name server (DNS) and forward the request to the S-CSCF of the called party.

In some other examples, the calling party (e.g., device 102 or device 104), after sending a request for a PTT call, receives an error message from network 110. The error message may indicate the PTT server (e.g., PTT server 116) is not responding in a period of time. Upon receiving the error message, the calling party may send a SIP request to establish a two-way call with the called party to IMS 114.

As discussed herein, by enabling the client device/UE (e.g., device 102 and/or device 104) with the capability to automatically switch a PTT call to a two-way audio call (e.g., voice over IP), missions, particularly, critical missions can be continuously and securely carried on. In addition, the PTT server (e.g., PTT server 116) may be further configured to monitor the audio quality of on-going PTT sessions. Once the audio quality is observed to be low, the PTT server may be configured to notify the calling party and/or the called party and provide an option to switch to two-way audio session so that the communication is not disconnected. By proactively monitoring the audio quality of on-going PTT sessions and promptly notifying the end user any quality issues with suggestions to switch to voice over IP, the PTT service provider (e.g., PTT service provider 112) can evaluate the PTT sessions and secure the communication more effectively.

It should be appreciated that example environment 100 is for illustration purposes. The present disclosure is not intended to be limiting. Multiple parties (e.g., devices, UEs, etc.) may be included in the PTT session 120 and/or the two-way audio session 122. When switching from a PTT session to a two-way audio session, the calling party and/or the called party may determine one or more parties among the multiple parties to be included in the two-way audio session. In some examples, a number of the multiple parties may be set as being equal to or less than four to avoid unwanted signaling and resource reservation on the network.

Figure 2:
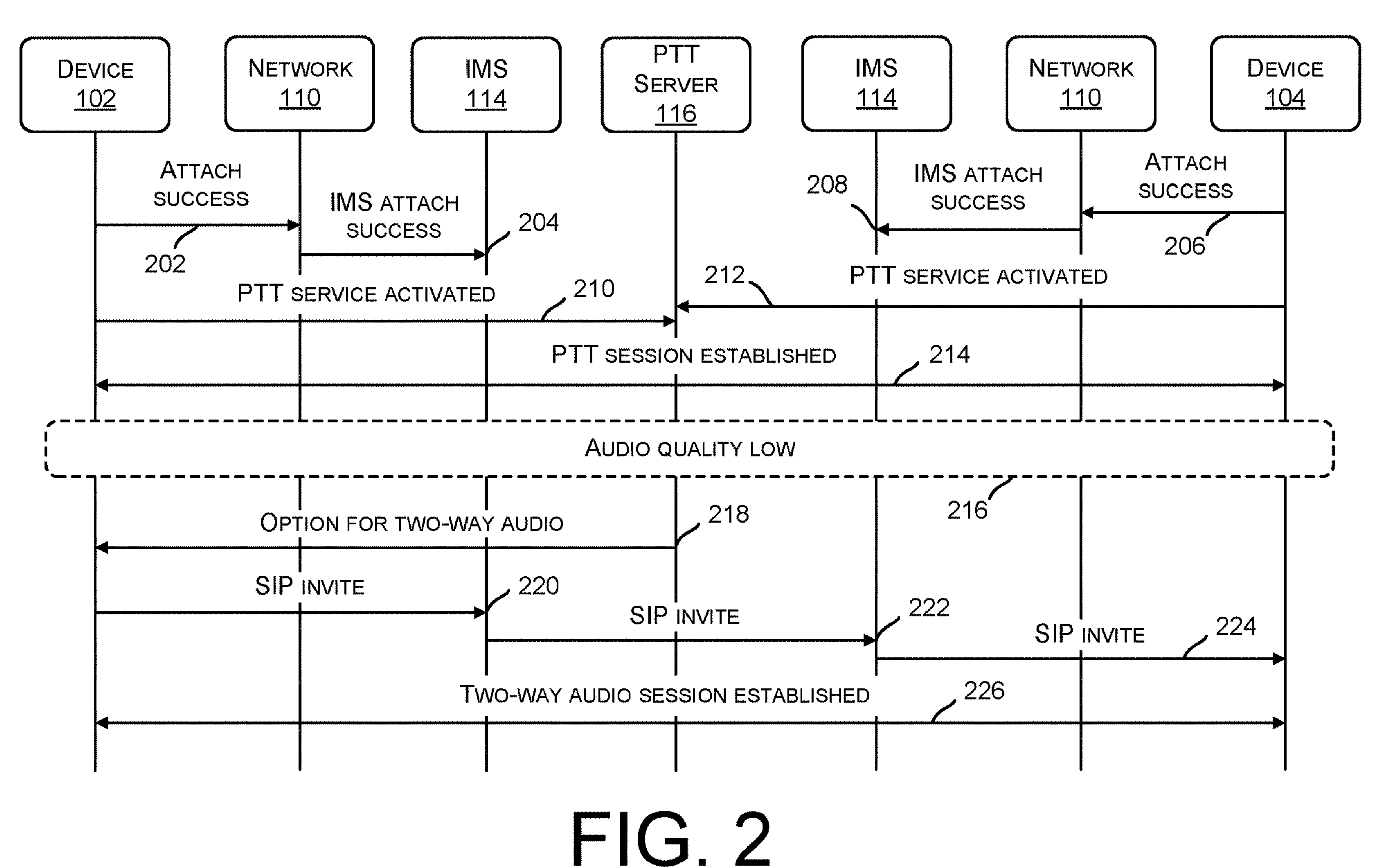
FIG. 2 illustrates an example diagram for switching push-to-talk mode to voice over IP, according to an example of the present disclosure.

FIG. 2 illustrates an example diagram for switching push-to-talk mode to voice over IP, according to an example of the present disclosure. Example diagram 200 illustrates a scenario that a push-to-talk session is switched to voice over IP when the audio quality is low.

As illustrated in FIG. 2, device 102 and device 104 that support PTT service may individually attach to an IMS network. An initial attachment may be performed when the device (e.g., device 102 and/or device 104) is powered on. When the device roams to a different network, causing a necessity to re-attach to the IMS network, the device may attempt to re-attach to the IMS network at the current geographic location. As discussed herein, device 102 may first attach to a packet core network (e.g., network 110) through an access point (e.g., access point 106 in FIG. 1). Once device 102 is successfully attached to network 110 (e.g., at operation 202), the request to register device 102 may be forwarded to an IMS network (e.g., IMS 114). Once the request to register device 102 is authenticated, device 102 is successfully attached to the IMS network (e.g., at operation 204). Similarly, device 104 may be attached to network 110 (e.g., at operation 206) through an access point (e.g., access point 108), and further attached to IMS 114 (e.g., at operation 208).

In implementations, after successfully attached to the IMS network, the devices (e.g., device 102 and/or device 104) may further communicate with a PTT server (e.g., PTT server 116) to activate the PTT service (e.g., at operation 210 and operation 212). As discussed herein, a user may activate the PTT service on the device by launching a PTT application on the device and/or by pressing a programmable key on the device. In some examples, the user may choose one or more called parties from the contact list on the device. In some other examples, the user may pre-program one or more keys on the device to be associated with one or more contacts so that a direct PTT call to a contact can be placed by pressing a corresponding key. Once a calling party starts to talk, a PTT session may be established between at least two devices (e.g., device 102 and device 104) at operation 214.

As discussed herein, PTT server 116 may be configured to monitor the call quality/audio quality of an on-going PTT session. In some examples, PTT server 116 may measure a Mean Opinion Score (MOS) while monitoring the PTT session based on multiple factors such as the specific codec used for the call. In some other examples, PTT server 116 may measure a signal-to-noise ratio (SNR) or voice jitter value while monitoring the PTT session. When the audio quality is measured low at operation 216, PTT server 116 may send a notification to the device and provide an option to switch to two-way audio call (e.g., at operation 218). In implementations, PTT server 116 may send the notification to any of the calling party or the called party that an option to switch to two-way audio call is available. The notification may be presented on a user interface of the device (e.g., device 102 and/or device 104). The notification may include a button prompting the user to switch the PTT session to two-way audio session. Alternatively or additionally, the notification may be presented with an audio message that allows an audio input to switch the PTT session to two-way audio session.

In some examples, upon receiving the notification, one party of the PTT session may choose to switch to a two-way audio call by clicking the button in the notification, by pressing a programmable key, and/or by voice inputting the instruction. The device of the party (e.g., device 102) may send a session initiation protocol (SIP) invite message to the IMS network it attaches to (e.g., at operation 220). The SIP invite message may be further forwarded to the called party through the IMS network that another party is attached to (e.g., at operation 222 and operation 224). As discussed herein, IMS network 114 may include multiple networks that serve different geographic areas. In some examples, both calling party and called party are attached to one IMS network. In some other examples, the calling party and the called party are attached to different IMS networks. It should be understood that IMS 114 of FIG. 2 may represent different networks of IMS 114. Those different networks of IMS 114 may be coupled to the packet core network (e.g., network 110). In implementations, when the SIP invite message from device 102 is accepted by device 104, a two-way audio session (e.g., a voice over IP session) is established at operation 226.

Figure 3:
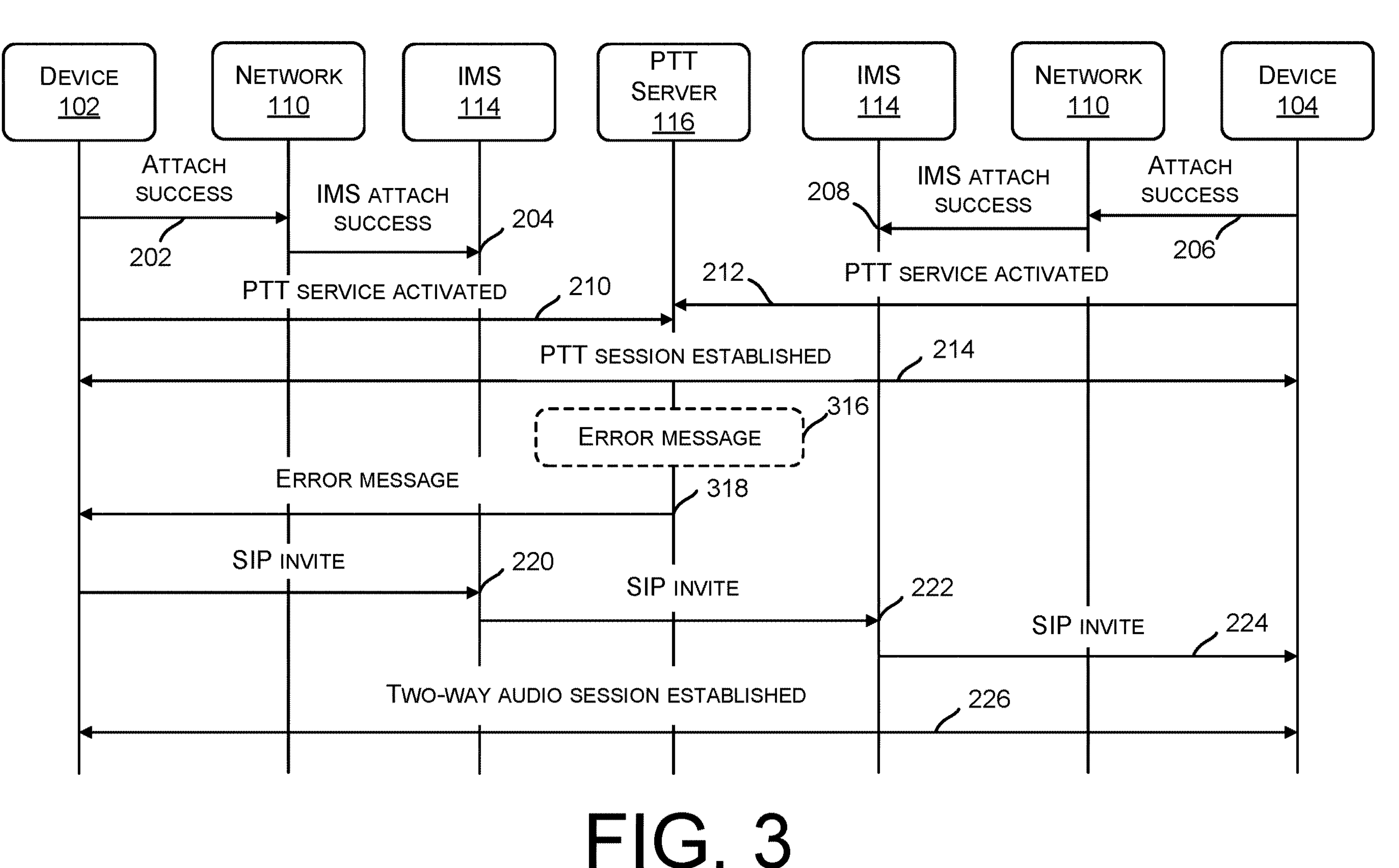
FIG. 3 illustrates an example diagram for switching push-to-talk mode to voice over IP, according to another example of the present disclosure.

FIG. 3 illustrates an example diagram for switching push-to-talk mode to voice over IP, according to another example of the present disclosure. Example diagram 300 illustrates a scenario that a push-to-talk session is switched to voice over IP when a PTT call receives no response from the PTT server.

As illustrated in FIG. 3, devices that support PTT service (e.g., device 102 and device 104) may pre-register to an IMS network (e.g., IMS 114). The registration to the IMS network includes operations similar to those described with respect to FIG. 2 (e.g., operation 202, operation 204, operation 206, operation 208, operation 210, operation 212, and operation 214). In some circumstances, due to network issues and/or server issues, a PTT calling party (e.g., device 102) may receive no response from the PTT server (e.g., PTT server 116). After a period of time (e.g., 7 seconds, 10 seconds, etc.), the PTT calling party (e.g., device 102) may receive an error message 316 from the network (e.g., network 110) at operation 318. The error message may include one or more error codes that indicate the PTT server is unavailable and/or there is some network connection issues (e.g., 4xx code and/or 5xx code).

Upon receiving the error message from the network, the PTT calling party (e.g., device 102) may automatically initiate a two-way audio call (e.g., voice over IP) to one or more called parities to establish a two-way audio session over the IMS network (e.g., IMS 114). In some examples, upon receiving the error message from the network, the PTT calling party may present a notification on the user interface of the device, prompting the user to switch to a two-way audio call. The setup of the two-way audio call may include operations similar to those described with respect to FIG. 2 (e.g., operation 220, operation 222, operation 224, and operation 226).

It should be appreciated that the scenarios to switch a push-to-talk session to two-way audio call described in FIG. 2 and FIG. 3 are for the purpose of illustration. The present disclosure is not intended to be limiting. Although not shown, multiple parties may participate a PTT call and/or a two-way audio call. When multiple parties are present in the PTT call, any of the calling party or the called party may determine certain parties to participate the two-way audio call. For example, a PTT call group may include twenty police officers of a police department out for a mission. When the audio quality of the PTT call is poor, the calling party may select ten police officers to continue the conversation on a two-way call.

Figure 4:
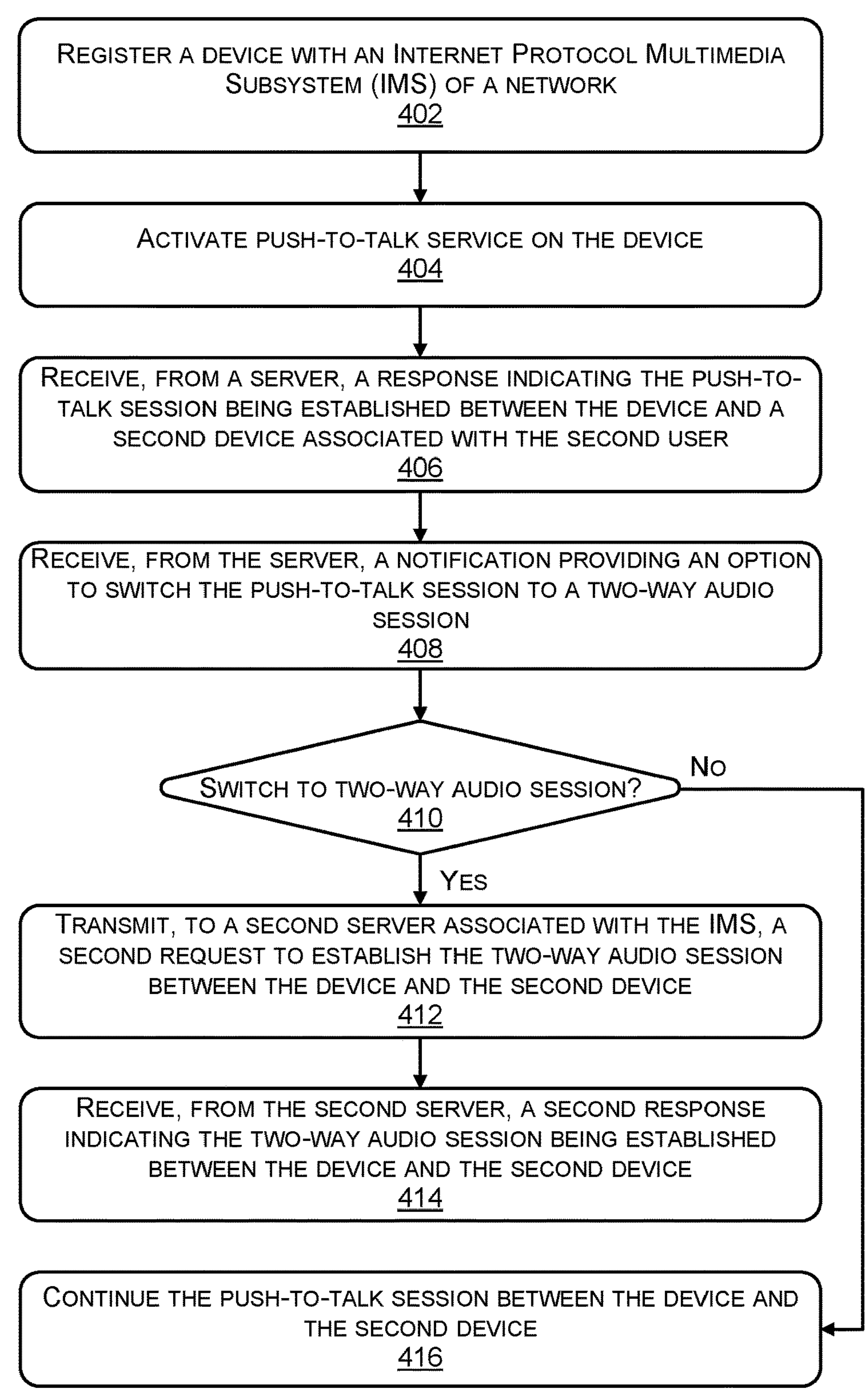
FIG. 4 illustrates an example process for switching push-to-talk mode to voice over IP, according to another example of the present disclosure.

FIG. 4 illustrates an example process for switching push-to-talk mode to voice over IP, according to another example of the present disclosure. The example process 400 may be performed by a device/user equipment (e.g., device 102 and/or device 104 of FIG. 1) and may correspond to the scenario described with respect to FIG. 2.

At operation 402, the process may include registering a device with an Internet Protocol (IP) Multimedia Subsystem (IMS) of a network. As discussed herein, the device may be any user equipment that is capable of transmitting/receiving data wirelessly using any wireless communication protocols or standards. The device may be further configured to support push-to-talk services over the wireless communication radios such as 2G/3G radio bands, 4G radio bands, 5G radio bands, or any future radio bands. The device may be registered to the IMS when the device is powered on and/or first connected to the network through an access point (e.g., 2G/3G base station, gNodeB, eNodeB, etc.). The device may further re-register to the IMS when the device roams and accesses the network through a different access point that necessitates a re-registration. As discussed herein, the network may include a 4G Evolved Packet Core (EPC) network, a 5G core network, or any core network that uses future radio access technologies.

In implementations, during registration and/or re-registration, the device (e.g., device 102 and/or 104 of FIG. 1) may send a register message to a P-CSCF of the IMS through the network (e.g., EPC network, 4G core network, etc.). The P-CSCF may then forward the register message to an I-CSCF to verify the user's identity and to locate an S-CSCF to provide the service to the device. The I-CSCF may query a home subscriber server (HSS) to verify the user's identity. Once the user is authenticated, the I-CSCF may query a domain name server (DNS) to locate an S-CSCF based at least in part on the geographic location of the device.

At operation 404, the process may include activating push-to-talk service on the device. In some examples, the device (e.g., device 102 and/or 104 of FIG. 1) may activate the push-to-talk service by pressing a key on the device pre-programmed for push-to-talk service. In implementations, the device may include one or more keys pre-programmed for push-to-talk service directed to one or more users and/or user groups. In some other examples, the device may activate the push-to-talk service by clicking on an application icon on the user interface of the device. In yet some other examples, the device may activate the push-to talk service by voice input to the microphone of the device.

At operation 406, the process may include receiving, from a server, a response indicating the push-to-talk session being established between the device and a second device associated with a second user. In some examples, the response may be played as a sound and/or displayed as a text message on the device.

At operation 408, the process may include receiving, from the server, a notification providing an option to switch the push-to-talk session to a two-way audio session. As discussed herein, once the push-to-talk session is established, the push-to-talk server (e.g., the push-to-talk server 116 of FIG. 1) may monitor the audio quality of the session in real-time. In some examples, the audio quality may be measured by a signal-to-noise ratio (SNR) over the radio. In some other examples, the audio quality may be measured by a Mean Opinion Score (MOS) code. In yet some other examples, the audio quality may be measured by a jitter value of the audio carried on the radio frequency. In implementations, when the audio quality is low or below a threshold, the push-to-talk server may send a notification to the device, providing an option to switch the current push-to-talk session to a two-way audio session (e.g., voice over IP session).

At operation 410, the user may determine whether to switch to a two-way audio session in response to the notification. When the user determines not to switch to a two-way audio session, the process continues at operation 416, in which the push-to-talk session is continued between the device and the second device. In some examples, the user may click a "no" button on the user interface to reject the switch notification. In some other examples, the user may audio input the "no" selection. In yet some other examples, when the push-to-talk server does not receive the user's input to switch after a certain period of time, the push-to-talk server may maintain the push-to-talk session between the device and the second device.

When user determines to switch to a two-way audio session by clicking the "switch" or "yes" button on the user interface and/or by audio input the "switch" or "yes" answer, at operation 412, the process may further include transmitting, to a second server associated with the IMS, a second request to establish the two-way audio session between the device and the second device. In implementations, once the device detects a user interaction with the user interface and/or the microphone indicative of a "switch" or "yes" answer, the device may automatically initiate a two-way audio call to the second user through the IMS. The request to initiate a two-way audio call may be further handled by the S-CSCF assigned to the device during registration. Through the network (e.g., EPC network, 5G core network, etc.), the S-CSCF assigned to the device (e.g., calling party) may connect to a second S-CSCF assigned to the second device (e.g., called party) to establish the two-way audio session.

In some examples, the push-to-talk session may include multiple parties. The user may determine to switch a portion of the multiple parties to the two-way audio session. In such circumstances, the user may select one or more parties from a contact list to continue the conversation on the two-way audio session. In some examples, the device may pre-program one or more groups in the contact list. For instance, when the user is a flight attendant of AA Flight #89, he/she may generate one or more groups in the contact list such as an attendant team, a pilot team, and a Flight #89 team. When there is a need to switch the push-to-talk session with all members of Flight #89 to a two-way session, the user may choose only the attendant team for the two-way session but drop the push-to-talk session with other people. In implementations, the user may make the selections via an interaction on the user interface, by audio input, and/or by pressing a pre-programmed key disposed on the device.

At operation 414, the process may include receiving, from the second server, a second response indicating the two-way audio session being established between the device and the second device.

Figure 5:
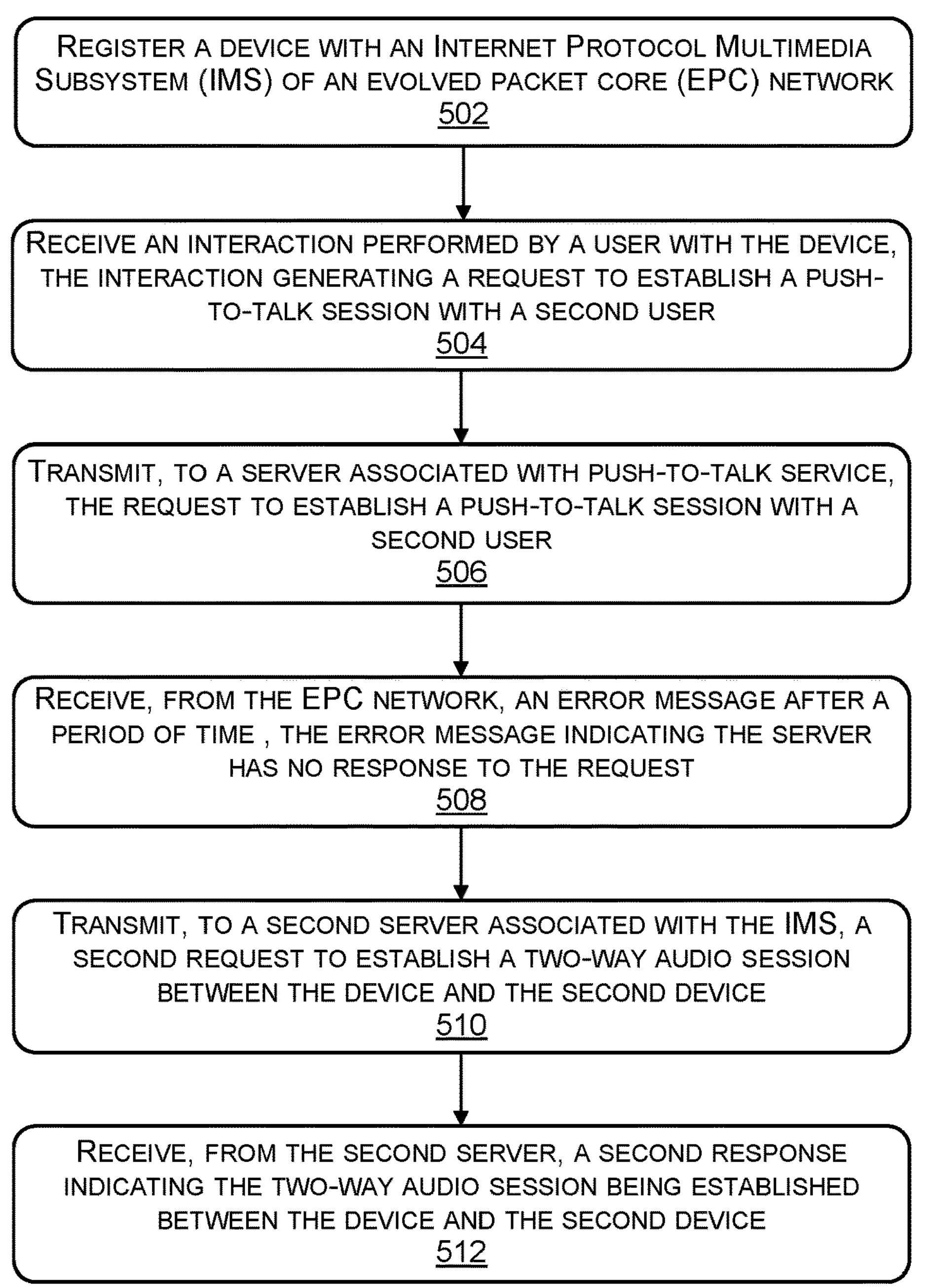
FIG. 5 illustrates an example process for switching push-to-talk mode to voice over IP, according to yet another example of the present disclosure.

FIG. 5 illustrate an example process for switching push-to-talk mode to voice over IP, according to yet another example of the present disclosure. The example process 500 may be performed by a device/user equipment (e.g., device 102 and/or device 104 of FIG. 1) and may correspond to the scenario described with respect to FIG. 3.

The operation 502 is similar to operation 402 of FIG. 4, in which, the process include registering a device with an Internet Protocol multimedia subsystem (IMS) of an evolved packet core (EPC) network. In some examples, devices of a calling party and a called party (e.g., device 102 and device 104) both register with the IMS prior to the push-to-talk session is established.

At operation 504, the process may include receiving an interaction performed by a user with the device, the interaction generating a request to establish a push-to-talk session with a second user. In some examples, the interaction performed by the user may include an interaction on the user interface of the device, an audio input through the microphone of the device, and/or a press on a key on the device.

At operation 506, the process may include transmitting, to a server associated with the push-to-talk service, the request to establish a push-to-talk session with the second user. In implementations, the server associated with the push-to-talk service (e.g., push-to-talk server 116 of FIG. 1) may be connected to the EPC core network and/or other packet core networks.

At operation 508, the process may include receiving, from the EPC network, an error message after a period of time, the error message indicating the server has no response to the request. Alternatively and/or additionally, the error message may indicate a network issue. For example, the device (e.g., device 102 and/or device 104) may receive a 4xx error message and/or a 5xx error message from the EPC network.

At operation 510, the process may include transmitting, to a second server associated with the IMS, a second request to establish a two-way audio session between the device and the second device.

At operation 512, the process may include receive, from the second server, a second response indicating the two-way audio session being established between the device and the second device.

Operation 510 and operation 512 may be performed similarly to operation 412 and operation 414 of FIG. 4, and therefore, are not detailed herein. Further, similar to the process described in FIG. 4, when multiple parties are involved in the initial push-to-talk session, the user may choose a portion of the multiple parties to communicate in the two-way audio session.

Figure 6A:
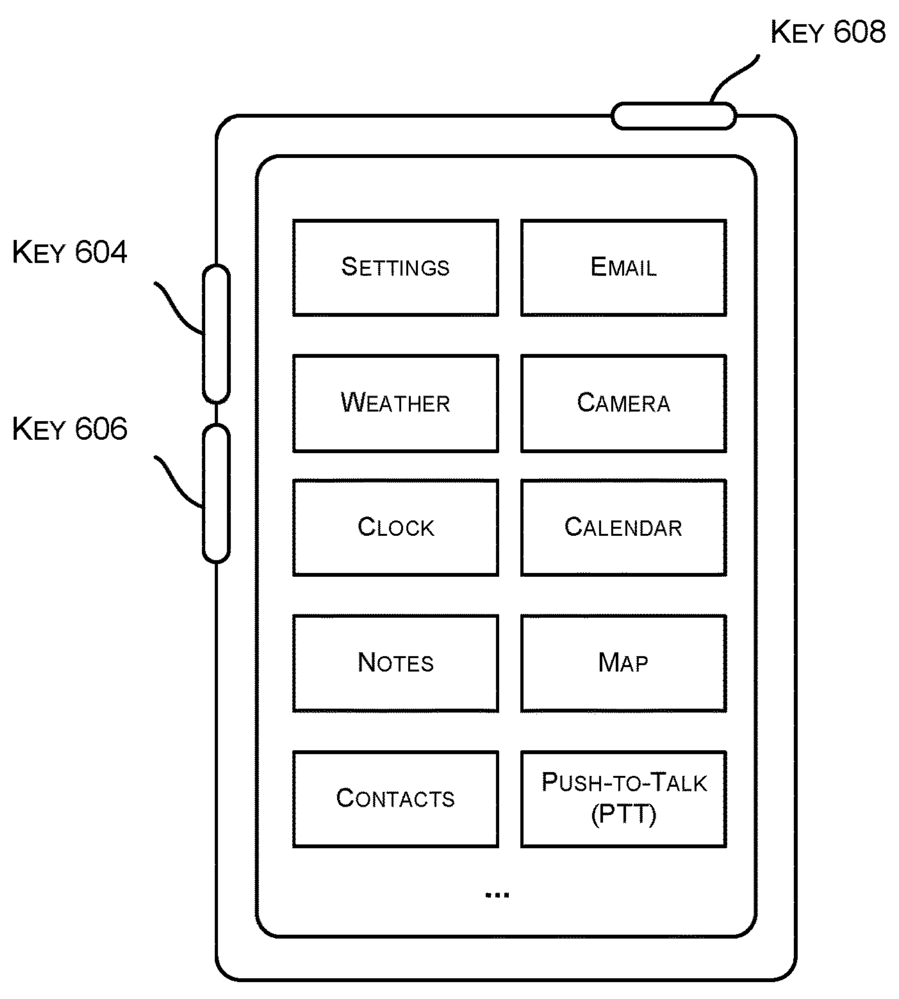
FIGS. 6A-6C illustrate an example device, in which methods for switching push-to-talk mode to voice over IP is implemented, according to an example of the present disclosure.
Figure 6B:
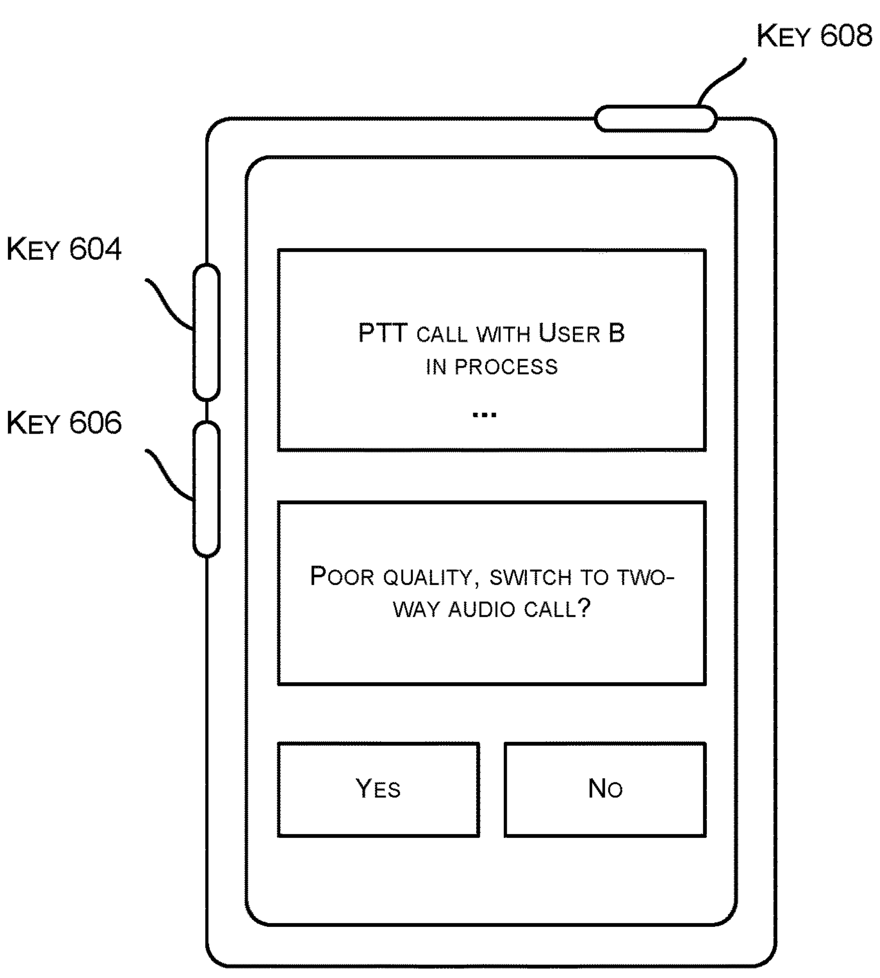
Figure 6C:
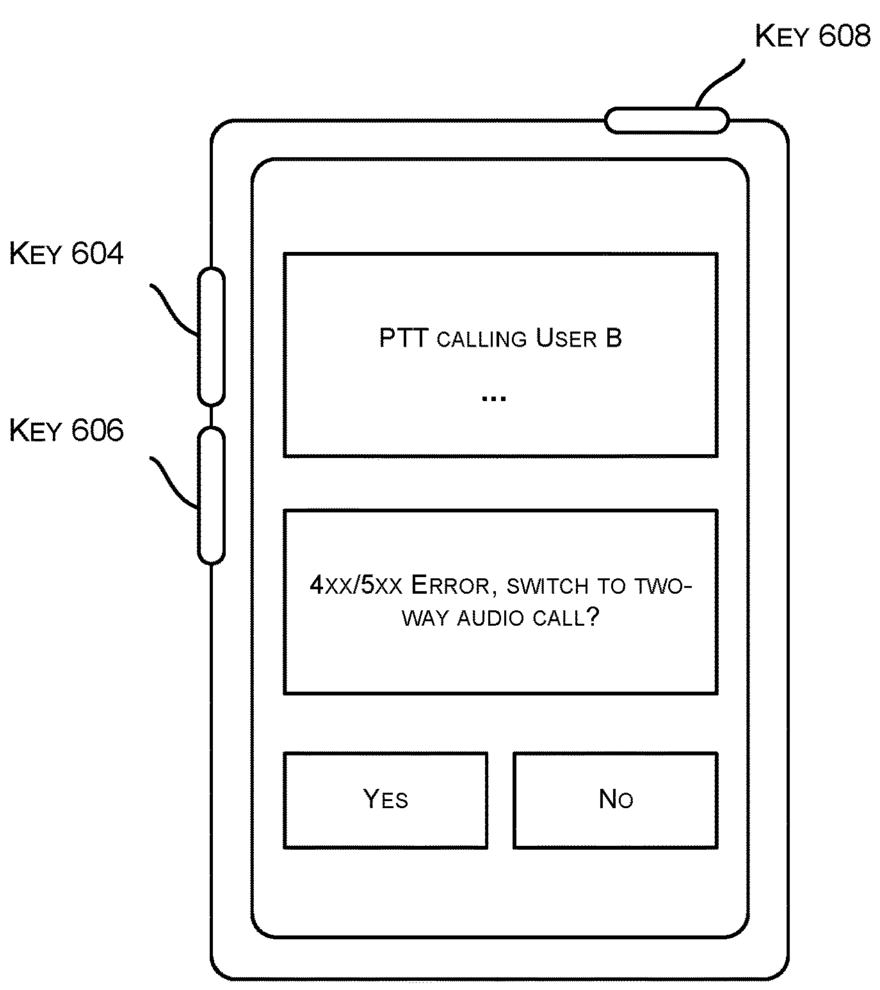

FIGS. 6A-6C illustrate an example device, in which methods for switching push-to-talk mode to voice over IP is implemented, according to an example of the present disclosure. Example device 600 may correspond to device 102 and/or device 104, as shown in FIG. 1.

FIG. 6A illustrates the example device 600 and an example user interface presented on example device 600. The example user interface may include a plurality of applications installed on the device such as settings, email, weather, camera, clock, calendar, notes, map, contacts, push-to-talk (PTT) application, etc. As illustrated, the device (e.g., device 102 and/or device 104) may include one or more keys disposed on the side of the device such as key 604 and key 606 disposed on the left side of the device, key 608 disposed on the top-right side of the device. Each of the keys (e.g., key 604, key 606, and key 608) may be pre-programmed with certain functions. In some examples, upon receiving a press on one of the keys, the device may automatically activate one of the plurality of applications installed on the device, for example, the push-to-talk (PTT) application. In some examples, one of the keys (e.g., key 604, key 606, and key 608) may be pre-programmed to upon detecting a press thereon, initiating a push-to-talk request to one or more target contacts. In some other examples, one of the keys (e.g., key 604, key 606, and key 608) may be pre-programmed to switch the push-to-talk session to a two-way audio session, upon receiving a press thereon.

FIG. 6B illustrates another example user interface after a push-to-talk call is established. The user interface may display a notification from the PTT server to provide an option to switch to two-way audio call due to poor quality while a PTT call with user B is in process. The user interface may also include a "Yes" and "No" button to receive the user input. In some examples, one of the keys (e.g., key 604, key 606, and key 608) may be programmed with the function to switch the PTT session to a VoIP session.

FIG. 6C illustrates another example user interface when a push-to-talk call is initiated. The user interface may display a notification from the PTT server to provide an option to switch to two-way audio call due to 4xx/5xx error while the device is attempting a PTT call to user B. Similar to user interface shown in FIG. 6(B), the user interface may also include a "Yes" and "No" button to receive the user input. In some examples, one of the keys (e.g., key 604, key 606, and key 608) may be programmed with the function to switch the PTT session to a VoIP session.

In some examples, a confirmation to switch to two-way audio call may also prompt the user with choices to have the two-way call with one or mor target parties. Any of the keys (e.g., key 604, key 606, and key 608) may be pre-programmed to establish the PTT call and/or the two-way audio call (e.g., voice over IP) with a target user and/or user group.

It should be appreciated that the example device and the example user interfaces shown in FIG. 6A, FIG. 6B, and FIG. 6C are for the illustration purpose. The present disclosure is not intended to be limiting. Any of the keys (e.g., key 604, key 606, and key 608) may be pre-programmed and/or re-programmed to support functions other that PTT services.

Figure 7:
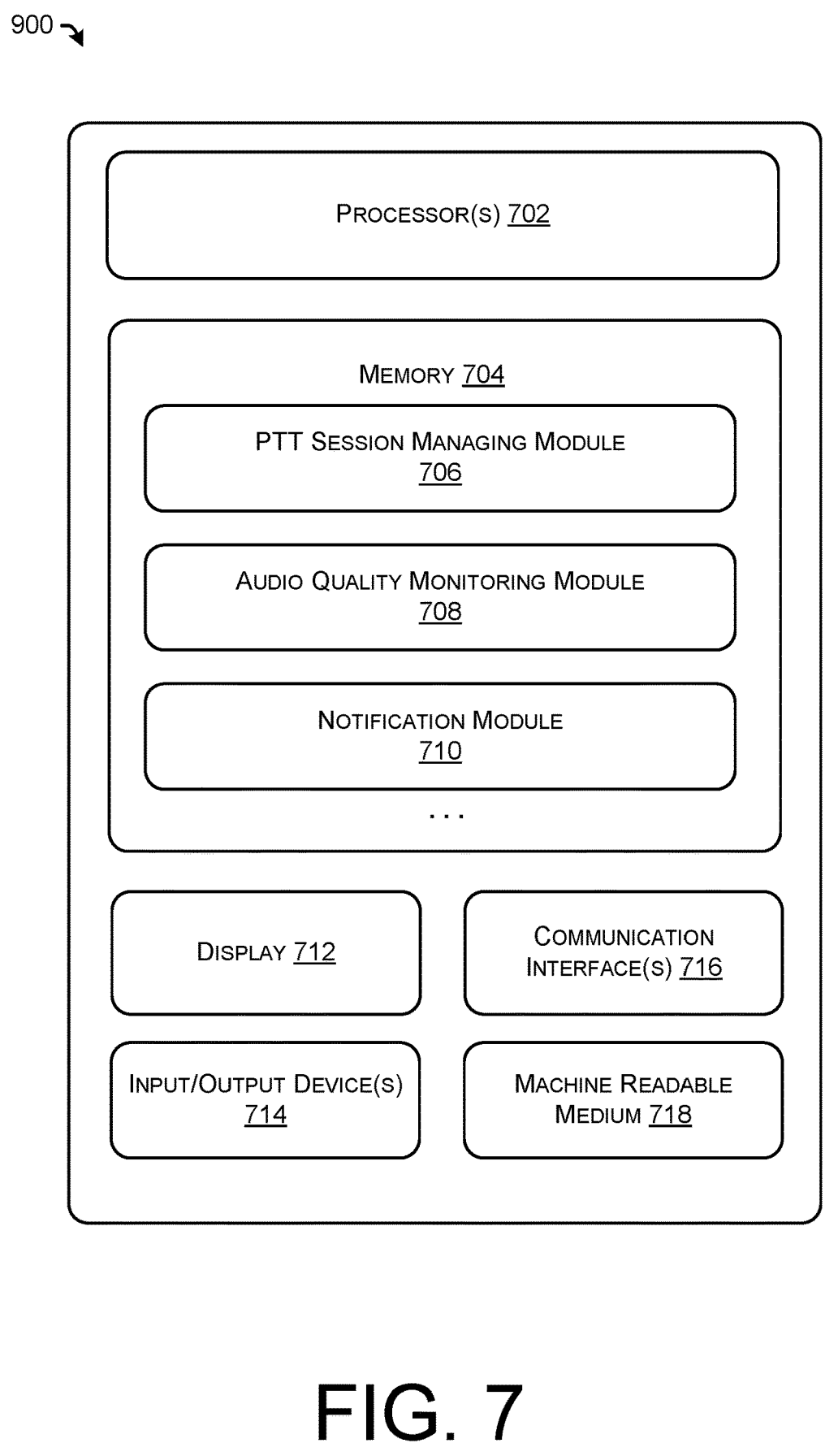

FIG. 7 illustrates an example computer server that implements techniques for switching push-to-talk mode to voice over IP, according to an example of the present disclosure. The example computer server 700 may correspond to push-to-talk server 116, as shown in FIGS. 1-3.

As illustrated in FIG. 7, the computer server 700 may comprise processor(s) 702, a memory 704 storing a PTT session management module 706, an audio quality monitoring module 708, and a notification module 710, a display 712, input/output device(s) 714, communication interface(s) 716, and/or a machine readable medium 718.

In various examples, the processor(s) 702 can be a central processing unit (CPU), a graphics processing unit (GPU), or both CPU and GPU, or any other type of processing unit. Each of the one or more processor(s) 702 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 702 may also be responsible for executing all computer applications stored in memory 704, which can be associated with common types of volatile (RAM) and/or nonvolatile (ROM) memory.

In various examples, the memory 704 can include system memory, which may be volatile (such as RAM), non-volatile (such as ROM, flash memory, etc.) or some combination of the two. The memory 704 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computer server 700. Any such non-transitory computer-readable media may be part of the computer server 700.

The PTT session management module 706 may be configured to receive a PTT session request from a calling party, forward the PTT session request to a called party through a network (e.g., a packet core network), and establish the PTT session between the calling party and the called party once the authentication of the calling party is verified. The PTT session management module 706 may maintain a direct connect using the network resources including access points such as base stations, gNodeBs, eNodeBs, etc., and the backbone infrastructure of the packet core network.

The audio quality monitoring module 708 may be configured to monitor the call quality of a PTT session. In some examples, the audio quality monitoring module 708 may calculate a Mean Opinion Score (MOS) of the PTT session. When the MOS value is below 3.1, the audio quality is determined to be poor, and when the MOS code value is between 3.1 and 3.6, the audio quality is determined to be low. In some other examples, the audio quality monitoring module 708 may calculate a signal-to-noise ratio (SNR) and/or a jitter value associated with the PTT session carried on the radio.

The notification module 710 may be configured to generate a notification to the device (e.g., devices associated with the calling party and/or the called party) to provide an option to switch the PTT session to a two-way audio session.

The communication interface(s) 716 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the communication interface(s) 716 can be compatible with multiple radio access technologies, such as 5G radio access technologies and 4G/LTE radio access technologies. Accordingly, the communication interfaces 716 can allow the computer server 700 to connect to the 5G system described herein.

Display 712 can be a liquid crystal display or any other type of display commonly used in the computer server 700. For example, display 712 may be a touch-sensitive display screen and can then also act as an input device or keypad, such as for providing a soft-key keyboard, navigation buttons, or any other type of input. Input/output device(s) 714 can include any sort of output devices known in the art, such as display 712, speakers, a vibrating mechanism, and/or a tactile feedback mechanism. Input/output device(s) 714 can also include ports for one or more peripheral devices, such as headphones, peripheral speakers, and/or a peripheral display. Input/output device(s) 714 can include any sort of input devices known in the art. For example, input/output device(s) 714 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 718 can store one or more sets of instructions, such as software or firmware, which embodies any one or more of the methodologies or functions described herein. The instructions can also reside, completely or at least partially, within the memory 704, processor(s) 702, and/or communication interface(s) 716 during execution thereof by the computer server 700. The memory 704 and the processor(s) 702 also can constitute machine readable media 718.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, are not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example examples.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A device comprising:

a processor; and a non-transitory computer-readable memory storing computer-executable instructions that, when executed by the processor, cause the processor to:

receive an interaction performed by a user with the device, the interaction generating a request to establish a push-to-talk session with a second user;

in response to the interaction, transmit, to a server associated with push-to-talk service, the request;

receive, from the server, a response indicating the push-to-talk session being established between the device and a second device associated with the second user;

receive, from the server, a notification providing an option to switch the push-to-talk session to a two-way audio session, the notification being generated by the server based on a Mean Opinion Score (MOS) code value associated with an audio quality associated with the push-to-talk session being below a threshold;

cause, on the device, the notification to be presented to the user including a selectable element for the user to confirm the switch;

receive, via the selectable element, a confirmation from the user to switch the push-to-talk session to the two-way audio session; and in response to the confirmation, transmit, to a second server associated with an Internet Protocol Multimedia Subsystem (IMS), a Session Initiation Protocol (SIP) invite message to establish the two-way audio session between the device and the second device.

2. The device of claim 1, wherein the computer-executable instructions, when executed by the processor, further cause the processor to:

pre-register the device with an Internet Protocol Multimedia Subsystem (IMS) of an evolved packet core (EPC) network.

3. The device of claim 2, wherein the computer-executable instructions, when executed by the processor, further cause the processor to:

receive, from the device, a selection of the option to switch the push-to-talk session to the two-way audio session;

in response to the selection, transmit, to a second server associated with the IMS, a second request to establish the two-way audio session between the device and the second device;

receive, from the second server, a second response indicating the two-way audio session being established between the device and the second device; and terminate the push-to-talk session between the device and the second device.

4. The device of claim 1, wherein the computer-executable instructions, when executed by the processor, further cause the processor to:

receive, from the device, a denial of the option to switch the push-to-talk session to the two-way audio session; and in response to the denial, maintain the push-to-talk session between the device and the second device.

5. The device of claim 1, wherein the audio quality associated with the push-to-talk session is monitored by the server after the push-to-talk session is established between the device and the second device, and the server is configured to:

determine that the audio quality is lower than a threshold, and in response to the audio quality being lower than the threshold, generate the notification providing the option to switch to the two-way audio session.

6. The device of claim 1, wherein the audio quality associated with the push-to-talk session is denoted by at least one of a signal to noise ratio (SNR) value or a jitter value.

7. The device of claim 1, wherein the computer-executable instructions, when executed by the processor, further cause the processor to:

receive, from the network, an error message after a period of time, the error message indicating the server has no response to the request;

transmit, to a second server associated with the network, a second request to establish the two-way audio session between the device and the second device associated with the second user; and receive, from the second server, a second response indicating the two-way audio session being established between the device and the second device.

8. The device of claim 7, wherein the second user includes a plurality of second users, and the computer-executable instructions, when executed by the processor, further cause the processor to:

receive a second interaction performed by the user with the device, the second interaction including a selection of a target second user from the plurality of second users; and in response to the selection, transmit, to the second server, the second request to establish the two-way audio session between the device and a target second device associated with the target second user.

9. The device of claim 8, wherein a number of the plurality of the second users is equal to or less than four.

10. A method implemented by a device, the method comprising:

receiving an interaction performed by a user with the device, the interaction generating a request to establish a push-to-talk session with a second user;

in response to the interaction, transmitting, to a server associated with push-to-talk service, the request;

receiving, from the server, a response indicating the push-to-talk session being established between the device and a second device associated with the second user;

receiving, from the server, a notification providing an option to switch the push-to-talk session to a two-way audio session, the notification being generated by the server based on a Mean Opinion Score (MOS) code value associated with an audio quality associated with the push-to-talk session being below a threshold;

causing, on the device, the notification to be presented to the user including a selectable element for the user to confirm the switch;

receiving, via the selectable element, a confirmation from the user to switch the push-to-talk session to the two-way audio session; and in response to the confirmation, transmitting, to a second server associated with an Internet Protocol Multimedia Subsystem (IMS), a Session Initiation Protocol (SIP) invite message to establish the two-way audio session between the device and the second device.

11. The method of claim 10, further comprising:

pre-registering the device with an Internet Protocol Multimedia Subsystem (IMS) of an evolved packet core (EPC) network.

12. The method of claim 11, further comprising:

receiving, from the device, a selection of the option to switch the push-to-talk session to the two-way audio session;

in response to the selection, transmitting, to a second server associated with the IMS, a second request to establish the two-way audio session between the device and the second device;

receiving, from the second server, a second response indicating the two-way audio session being established between the device and the second device; and terminating the push-to-talk session between the device and the second device.

13. The method of claim 10, further comprising:

receiving, from the device, a deny of the option to switch the push-to-talk session to the two-way audio session; and in response to the deny, maintaining the push-to-talk session between the device and the second device.

14. The method of claim 10, wherein the audio quality associated with the push-to-talk session is monitored by the server after the push-to-talk session is established between the device and the second device, and the method further comprises:

determining that the audio quality is lower than a threshold, and in response to the audio quality being lower than the threshold, generating the notification providing the option to switch to the two-way audio session.

15. The method of claim 10, wherein the audio quality associated with the push-to-talk session is denoted by at least one of a signal to noise ratio (SNR) value or a jitter value.

16. The method of claim 10, further comprising:

receiving, from the network, an error message after a period of time, the error message indicating the server has no response to the request;

transmitting, to a second server associated with the network, a second request to establish the two-way audio session between the device and the second device associated with the second user; and receiving, from the second server, a second response indicating the two-way audio session being established between the device and the second device.

17. The method of claim 16, further comprising:

receiving a second interaction performed by the user with the device, the second interaction including a selection of a target second user from the plurality of second users; and in response to the selection, transmitting, to the second server, the second request to establish the two-way audio session between the device and a target second device associated with the target second user.

18. The method of claim 17, wherein a number of the plurality of the second users is equal to or less than four.

19. A computer-readable storage medium storing computer-readable instructions, when executed by a processor, cause the processor to perform operations including:

receiving an interaction performed by a user with a device, the interaction generating a request to establish a push-to-talk session with a second user;

in response to the interaction, transmitting, to a server associated with push-to-talk service, the request;

receiving, from the server, a response indicating the push-to-talk session being established between the device and a second device associated with the second user;

receiving, from the server, a notification providing an option to switch the push-to-talk session to a two-way audio session, the notification being generated by the server based on a Mean Opinion Score (MOS) code value associated with an audio quality associated with the push-to-talk session being below a threshold;

causing, on the device, the notification to be presented to the user including a selectable element for the user to confirm the switch;

receiving, via the selectable element, a confirmation from the user to switch the push-to-talk session to the two-way audio session; and in response to the confirmation, transmitting, to a second server associated with an Internet Protocol Multimedia Subsystem (IMS), a Session Initiation Protocol (SIP) invite message to establish the two-way audio session between the device and the second device.

20. The computer-readable storage medium of claim 19, wherein the computer-readable instructions, when executed by a processor, cause the processor to further perform operations including:

pre-registering the device with an Internet Protocol Multimedia Subsystem (IMS) of an evolved packet core (EPC) network;

receiving, from the device, a selection of the option to switch the push-to-talk session to the two-way audio session;

in response to the selection, transmitting, to a second server associated with the IMS, a second request to establish the two-way audio session between the device and the second device;

receiving, from the second server, a second response indicating the two-way audio session being established between the device and the second device; and terminating the push-to-talk session between the device and the second device.

* * * * *